(12) United States Patent
Mannava et al.

(10) Patent No.: US 7,304,266 B2
(45) Date of Patent: Dec. 4, 2007

(54) LASER SHOCK PEENING COATING WITH ENTRAPPED CONFINEMENT MEDIUM

(75) Inventors: Seetha Ramaiah Mannava, Cincinnati, OH (US); William Dewaine Cowie, Xenia, OH (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 11/008,702

(22) Filed: Dec. 9, 2004

(65) Prior Publication Data

US 2006/0124619 A1    Jun. 15, 2006

(51) Int. Cl.
*B23K 26/00* (2006.01)
*B23K 26/02* (2006.01)

(52) U.S. Cl. .................. 219/121.84; 219/121.85; 219/121.81; 219/121.6

(58) Field of Classification Search .......... 219/121.84, 219/121.85, 121.81, 121.6
See application file for complete search history.

(56) References Cited

U.S. PATENT DOCUMENTS

| | | | |
|---|---|---|---|
| 3,850,698 A | | 11/1974 | Mallozzi et al. |
| 4,401,477 A | | 8/1983 | Clauer et al. |
| 5,317,002 A | * | 5/1994 | Onishi .................. 503/227 |
| 5,674,328 A | | 10/1997 | Mannava et al. |
| 5,744,781 A | * | 4/1998 | Yeaton .................. 219/121.84 |
| 6,049,058 A | | 4/2000 | Dulaney et al. |
| 6,245,486 B1 | | 6/2001 | Teng |
| 6,558,485 B2 | | 5/2003 | Moreman, III |
| 6,677,037 B1 | * | 1/2004 | Miller et al. ............... 428/345 |
| 7,148,941 B2 | * | 12/2006 | Nair et al. ................. 349/117 |

FOREIGN PATENT DOCUMENTS

| EP | 0 933 438 A1 | 8/1999 |
|---|---|---|
| EP | 1 288 318 A1 | 3/2003 |

OTHER PUBLICATIONS

European Search Report, Application No. 05257393, Mar. 2, 2006, 3 pages.
Delphion, Derwent Record, "Laser shock treatment of solid crystalline material—using elastomer or liq. polymer as plasma confinement medium", https://www.delphion.com, Mar. 16, 2006, 2 pages.

* cited by examiner

*Primary Examiner*—M. Alexandra Elve
(74) *Attorney, Agent, or Firm*—William Scott Andes; Steven J. Rosen

(57) ABSTRACT

An integrated laser shock peening coating includes film or a tape having an ablative medium layer spaced apart from a clear containment layer and a stationary clear liquid confining medium therebetween wherein the clear transparent to a laser beam used for laser shock peening. Two examples of the clear liquid confining medium are water and a mixture of water and agar without flowing a confinement curtain of fluid over the surface upon which the laser beam is firing. The intergrated laser shock peening coating may be a tape with an adesive layer being disposed on a first side ablative medium layer. A method of laser shock peening includes coating a substrate of an article with the intergrated laser shock peening coating and firing a laser beam on the coated substrate with sufficient power to form a region having deep compressive residual stresses extending into the substrate.

24 Claims, 5 Drawing Sheets

LASER SHOCK PEENING COATING WITH ENTRAPPED CONFINEMENT MEDIUM

BACKGROUND OF THE INVENTION

1. Field of the Invention

This invention relates to laser shock peening and, more particularly, to a coating and method for laser shock peening.

2. Description of Related Art

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shock wave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

High energy laser beams, from about 20 to about 50 Joules, or low energy laser beams, from about 3 to about 10 Joules, have been used and other levels are contemplated. See, for example, U.S. Pat. No. 5,674,329 (Mannava et al.), issued Oct. 7, 1997 (LSP process using high energy lasers) and U.S. Pat. No. 5,932,120 (Mannava et al.), issued Aug. 3, 1999 (LSP process using low energy lasers). Low energy laser beams can be produced using different laser materials such as neodymium doped yttrium aluminum garnet (Nd YAG), Nd:YLF, and others. Laser shock peening processes typically employ a curtain of water or other confinement liquid medium flowed over the article or some other method to provide a plasma confining medium. This medium enables the plasma to rapidly achieve shockwave pressures that produce the plastic deformation and associated residual stress patterns that constitute the LSP effect. The curtain of water provides a confining medium, to confine and redirect the process generated shockwaves into the bulk of the material of a component being LSP'D, to create the beneficial compressive residual stresses. It is not possible to deliver the flowing water for certain applications because of either space limitations or geometry of the component. U.S. Pat. No. 6,677,037 entitled "Laser Shock Peening Tape, Method And Article"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee describe various coatings and confinement mediums for use in LSP processing including a curtain of flowing water or a separate sheet of clear confinement material. It is not always possible to deliver the flowing water for certain applications because of either space limitations or geometry of the component being laser shock peened. It is desirable to package the confinement medium and attach this package to the component to achieve the desired LSP effect.

SUMMARY OF THE INVENTION

An integrated laser shock peening coating includes an ablative medium layer spaced apart from a clear containment layer and a stationary clear liquid confining medium therebetween. The clear is transparent to a laser beam used for laser shock peening. Water or a mixture of water and agar are examples of suitable clear liquid confining mediums. The integrated laser shock peening coating may be a tape in which the ablative medium layer has opposite first and second sides, an adhesive layer disposed on the first side, and the clear liquid confining medium entrapped against the second side by the clear containment layer. The integrated laser shock peening coating may be used on article prepared for laser shock peening in which a substrate of the article is coated with the integrated laser shock peening coating.

A method of laser shock peening an article includes coating a laser shock peening surface of a substrate of the article with the integrated laser shock peening coating. The integrated laser shock peening coating includes an ablative medium layer spaced apart from a clear containment layer. A clear liquid confining medium is disposed between the integrated laser shock peening coating and the ablative medium layer. The clear is transparent to a laser beam used for laser shock peening. Firing a laser beam on the coated substrate with sufficient power to vaporize at least a portion of the ablative medium layer forming a region having deep compressive residual stresses extending into the substrate from the laser shock peening surface. The firing step may include firing the laser with repeatable pulses between relatively constant periods on the coated substrate while providing continuous movement between the laser beam and the article.

DETAILED DESCRIPTION OF THE INVENTION

Figure 1:
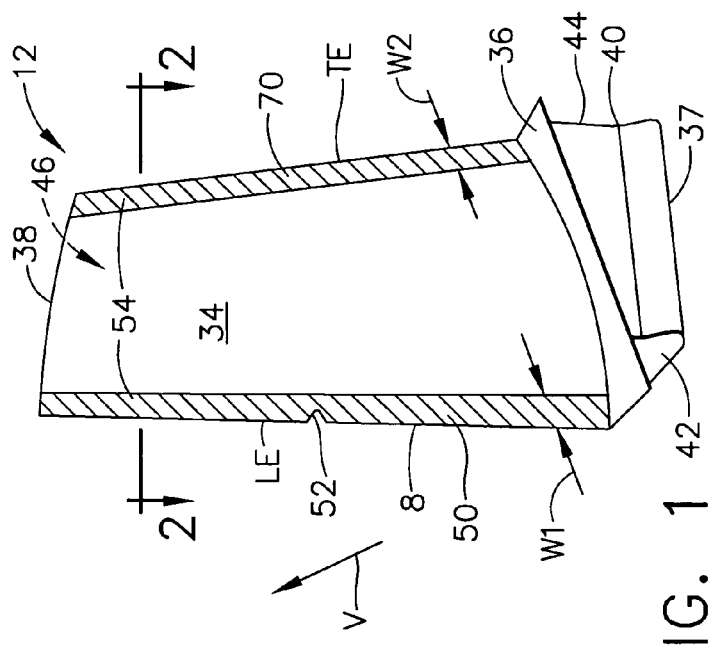
FIG. 1 is a perspective view illustration of a gas turbine engine fan blade laser shock peened using an exemplary embodiment of an integrated laser shock peening coating and method of using same.
Figure 2:
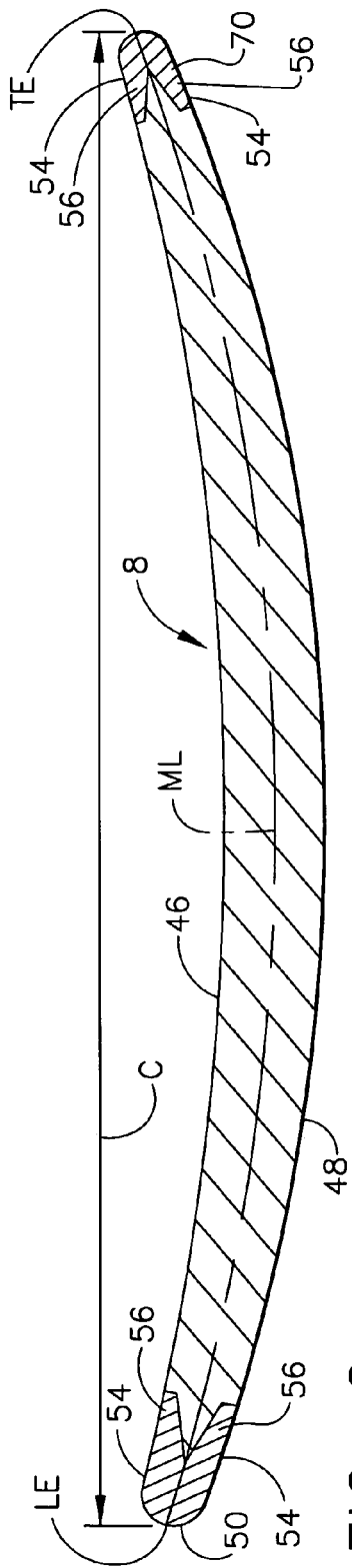
FIG. 2 is a cross-sectional view illustration of the fan blade in FIG. 1.
Figure 3:
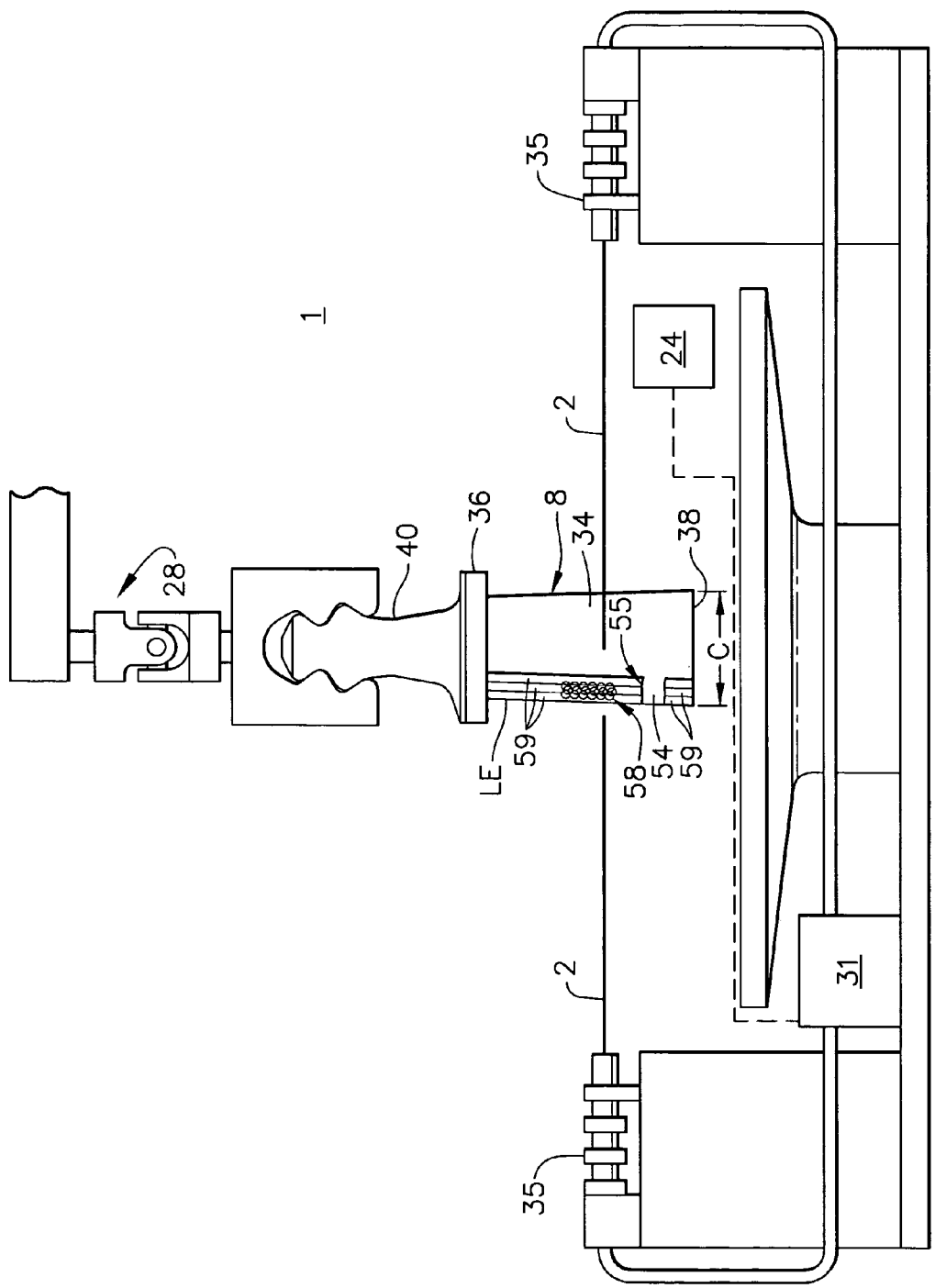
FIG. 3 is a schematic perspective view illustration of the blade of FIG. 1 coated with the integrated laser shock peening coating and mounted in a laser shock peening system.

Illustrated in FIGS. 1, 2 and 3, is a fan blade 8 having an airfoil 34 made of a Titanium alloy extending radially outward from a blade platform 36 to a blade tip 38. The fan blade 8 exemplifies an article 12 having a hard metallic substrate 10 upon which an integrated laser shock peening coating 57 is applied and method of using same for laser shock peening. A laser shock peening surface 54 of the substrate 10 is covered by the integrated laser shock peening coating 57 which includes an ablative medium layer 64 spaced apart from a clear containment layer 66 and a stationary clear liquid confining medium 68 therebetween. The clear liquid confining medium 68 serves as a confining layer trapped between the ablative medium layer 64 and clear containment layer 66.

The integrated laser shock peening coating 57 may be in the form of film or tape 59. If it is in tape form, it includes the self-adhering adhesive layer 60. If the integrated laser shock peening coating 57 is in film form, a suitable adhesive material may be applied directly to the laser shock peening surface 54 before applying the integrated laser shock peening coating 57. Suggested materials for the ablative and clear containment layers include plastic, such as vinyl plastic film, wherein the ablative medium may be pigmented black and the containment layer pigmented clear. The film or tape should be rubbed or otherwise pressed against the shock peening surface 54 to remove bubbles that may remain between the ablative layer and the laser shock peening surface. The integrated laser shock peening coating 57 coats the substrate 10 to form a laser shock peening coated surface 55.

Illustrated in FIGS. 1 and 2 is a schematic representation of an exemplary aircraft turbofan gas turbine engine fan blade 8 for laser shock peening using the integrated laser shock peening coating 57. The fan blade 8 includes an airfoil 34 extending radially outward from a blade platform 36 to a blade tip 38. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading edge LE and trailing edge TE at each cross-section of the blade as illustrated in FIG. 2. A pressure side 46 of the airfoil 34 faces in the general direction of rotation as indicated by an arrow V and a suction side 48 is on the other side of the airfoil and a mean-line ML is generally disposed midway between the two faces in the chordwise direction.

The fan blade 8 has leading and trailing edge sections 50 and 70 that extend along the leading and trailing edges LE and TE, respectively, of the airfoil 34 from the blade platform 36 to the blade tip 38. The leading and trailing edge sections 50 and 70 includes first and second widths W1 and W2, respectively, such that the leading and trailing edge sections 50 and 70 encompass nicks 52 and tears that may occur along the leading and trailing edges of the airfoil 34. The airfoil 34 is subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the blade along possible crack lines that can develop and emanate from the nicks and tears, at least one and preferably both of the pressure side 46 and the suction side 48 have a laser shock peening surfaces 54 and a pre-stressed region 56 having deep compressive residual stresses imparted by laser shock peening (LSP) extending into the airfoil 34 from the laser shock peened surfaces as seen in FIG. 2. Preferably, the pre-stressed regions 56 are co-extensive with the leading and trailing edge sections 50 and 70 in the chordwise direction to the full extent of widths W1 and W2 and are deep enough into the airfoil 34 to coalesce for at least a part of the widths. The pre-stressed regions 56 are shown co-extensive with the leading edge section 50 in the radial direction along the leading edge LE but may be shorter.

Figure 4:
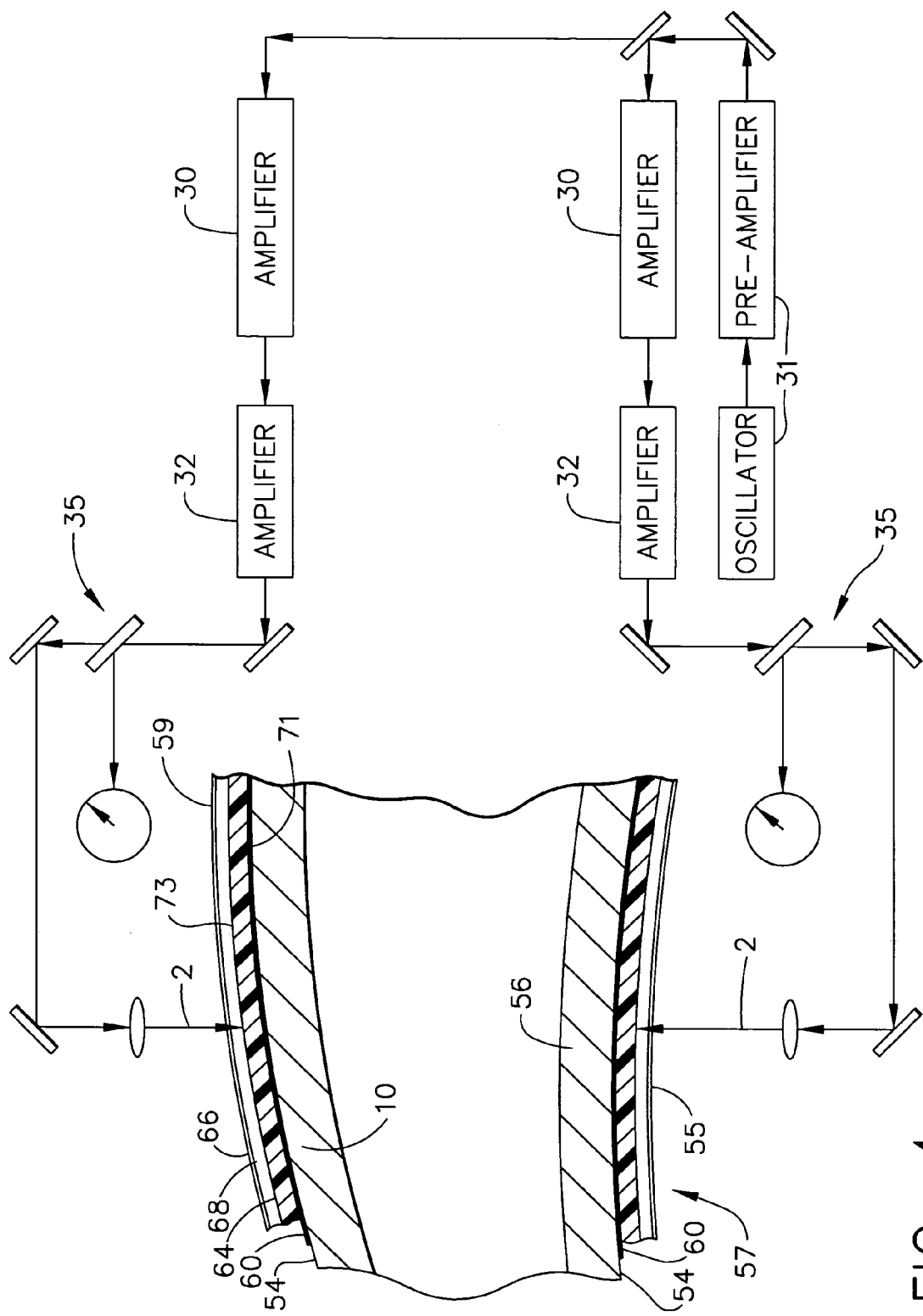
FIG. 4 is a partial cross-sectional and a partial schematic view illustration of the blade coated with the integrated laser shock peening coating in FIG. 3 being laser shock peened.

Illustrated in FIGS. 3 and 4 is the blade 8 mounted in a robotic arm 28 used to move and position the blade to effect laser shock peening "on the fly". The invention is illustrated for use in laser shock peening the leading edge section 50, in accordance with an embodiment of the present invention, as indicated by a laser shock peening surface 54, which is covered by the integrated laser shock peening coating 57 having overlapping laser shocked peened circular spots 58. The layer of an adhesive tape 59 is representative of the integrated laser shock peening coating 57 which may also be in the form of a film.

Illustrated in FIG. 4 is a laser shock peening apparatus 1 including a laser beam apparatus having a generator 31 with an oscillator and a pre-amplifier and a beam splitter which feeds the pre-amplified laser beam into two beam optical transmission circuits each having a first and second amplifier 30 and 32, respectively, and optics 35 which include optical elements that transmit and focus the laser beam 2 on the laser shock peening coated surface 55 and the integrated laser shock peening coating 57. The controller 24 may be used to modulate and fire the laser beam apparatus to fire the laser beam 2 on the laser shock peening coated surface 55 in a controlled manner.

The laser beam shock induced deep compressive residual stresses in the compressive pre-stressed regions 56 are generally about 50-150 KPSI (Kilo Pounds per Square Inch) extending from the laser shock peening surfaces 54 to a depth of about 20-50 mils into laser shock induced compressive residually stressed regions. The laser beam shock induced deep compressive residual stresses are produced by repetitively firing a high energy laser beam 2 that is defocused±a few mils with respect to the laser shock peening coated surface 55. The laser beam 2 typically has a peak power density on the order of magnitude of a gigawatt/cm$^2$ and is fired without the use of a curtain of flowing water or other fluid that is flowed over the coated surface 55 in the prior art. The ablative medium is ablated generating plasma which results in shock waves on the surface of the material. These shock waves are redirected towards the laser shock peening surface 54 by the clear liquid confining medium 68 or confining layer to generate travelling shock waves (pressure waves) in the material below the laser shock peening surface 54. The amplitude and quantity of these shockwave determine the depth and intensity of compressive stresses. The integrated laser shock peening coating 57 is used to protect the target surface, generate plasma, and confine the explosion and direct the shockwave to the laser shock peening surface 54.

The laser may be fired sequentially "on the fly", as illustrated in FIG. 4, so that the coated surface 55 is laser shock peened with more than one sequence of firings on the laser shock peening coated surface 55. The preferred embodiment of the method of the present invention includes continuously moving the blade while continuously firing the laser beam on the taped surface such that adjacent laser shock peened circular spots are hit in different sequences. However, the laser beam may be moved instead just so long as relative movement between the beam and the surface is effected. The laser is fired with repeatable pulses between relatively constant periods on the coated substrate 10 while providing continuous movement between the laser beam and the article 12.

Figure 5:
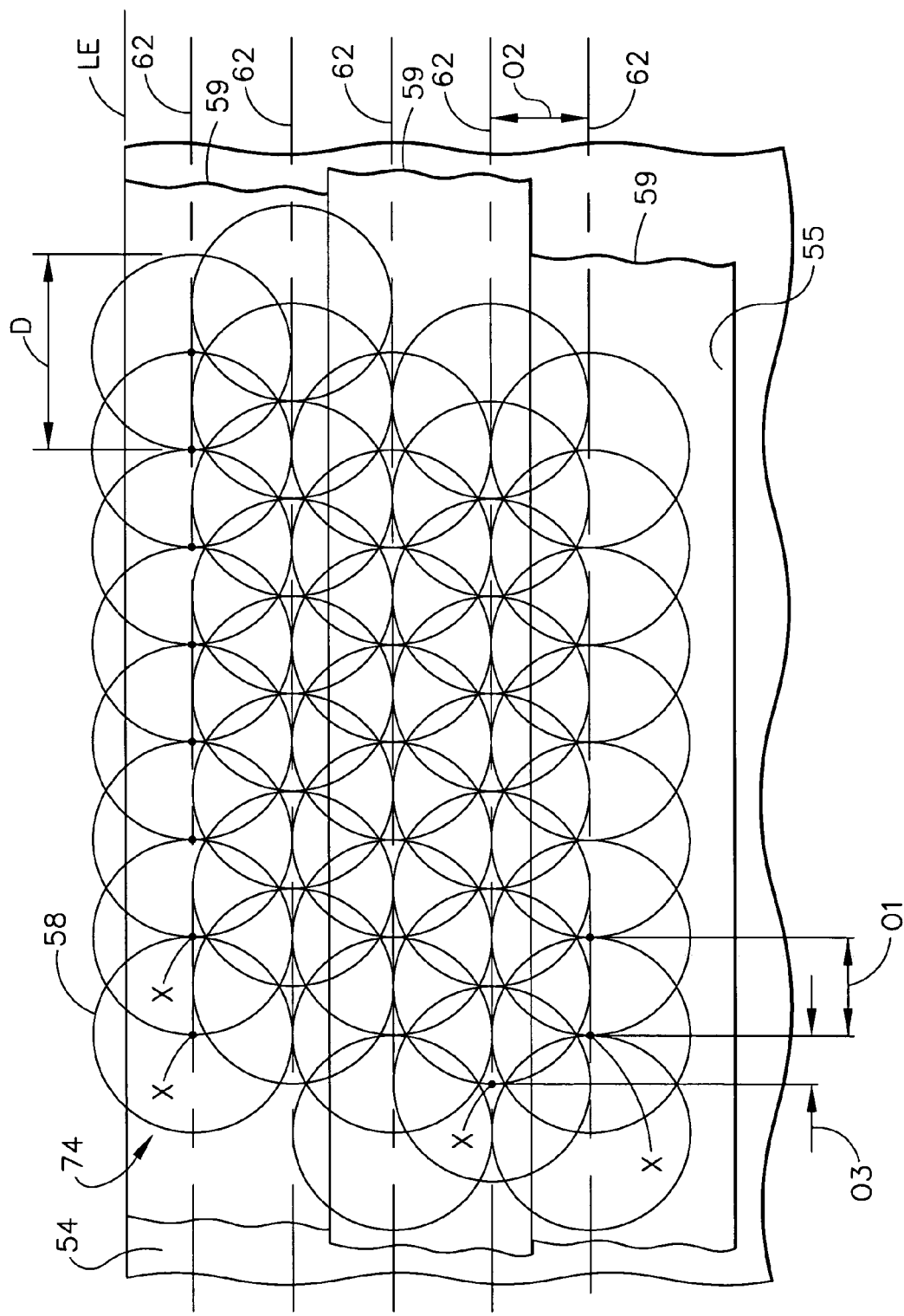
FIG. 5 is a schematic illustration of a pattern of laser shock peen circular spots on a laser shock peen surface.
Figure 6:
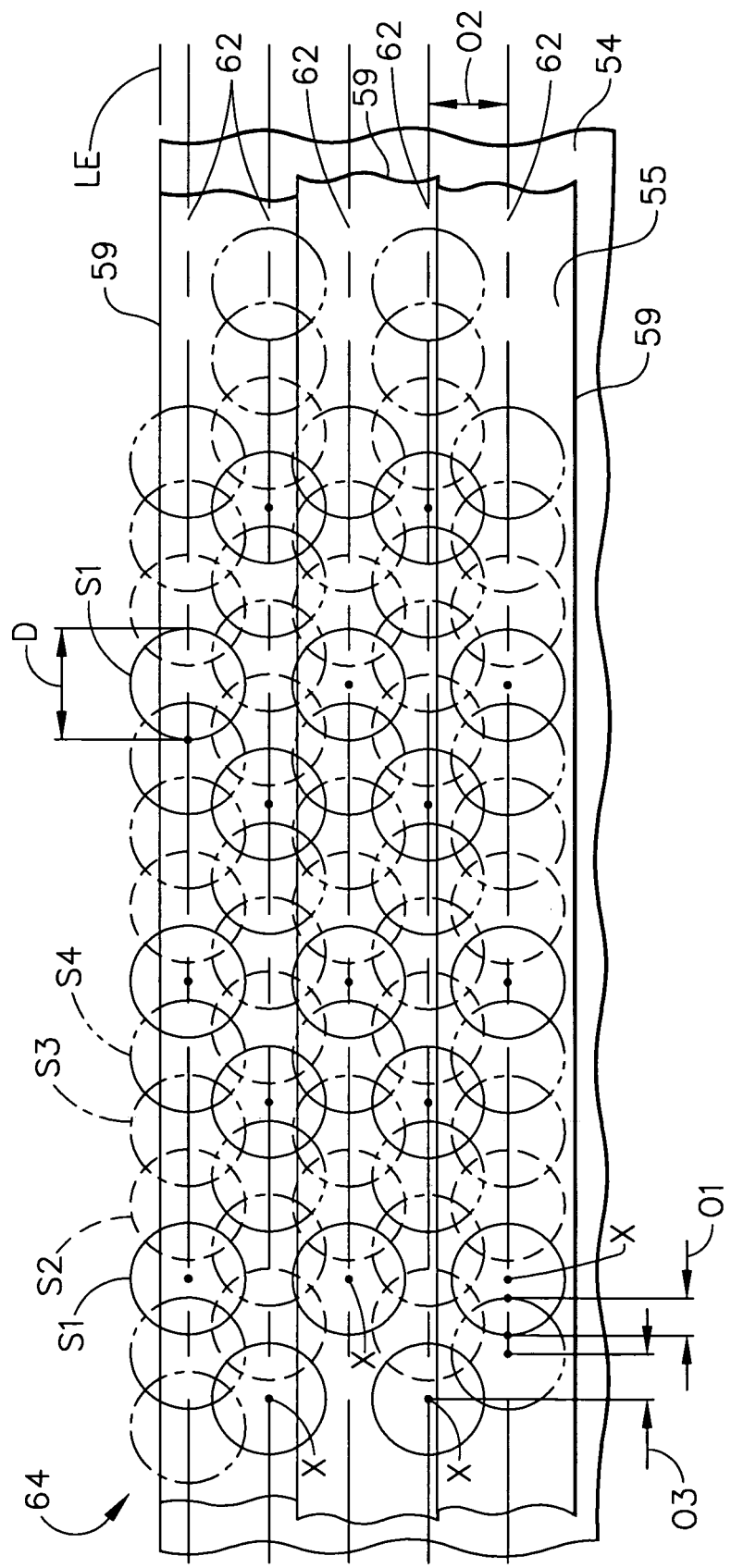
FIG. 6 is a schematic illustration of a particular pattern having four sequences of laser shock peen circular spots.

FIGS. 4 and 5 illustrates a pattern of laser shocked peened circular spots 58 (indicated by the circles) of four such sequences S1 through S4. The S1 sequence is shown as full line circles, as opposed to dotted line circles of the other sequences, to illustrate the feature of having non-adjacent laser shocked peened circular spots 58 with their corresponding centers X along a row centerline 62. The pattern of sequences entirely covers the laser shock peening coated surface 55. The laser shocked peened circular spots 58 have a diameter D in a row 74 of overlapping laser shock peened circular spots. The pattern may be of multiple overlapping rows 74 of overlapping shock peened circular spots on the laser shock peening coated surface 55. A first overlap is between adjacent laser shocked peened circular spots 58 in a given row and is generally defined by a first offset O1 between centers X of the adjacent laser shock peened circular spots 58 and can vary from about 30%-50% or more of the diameter D. A second overlap is between adjacent laser shock peened circular spots 58 in adjacent rows and is generally defined by a second offset O2 between adjacent row centerlines 62 and can vary from about 30%-50% of the diameter D depending on applications and the strength or fluency of the laser beam. A third overlap in the form of a linear offset O3 between centers X of adjacent laser shock peened circular spots 58 in adjacent rows 74 and can vary from about 30%-50% of the diameter D depending on a particular application.

This method is designed so that only virgin or near virgin tape is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-coating of the laser shock peening surfaces 54 is done between each sequence of laser firings. The laser firing each sequence has multiple laser firings or pulses with a period between firings that is often referred to a "rep". During the rep, the part is moved so that the next pulse occurs at the location of the next laser shocked peened circular spot 58. Preferably, the part is moved continuously and timed to be at the appropriate location at the pulse or firing of the laser beam. One or more repeats of each sequence may be used to hit each laser shocked peened circular spot 58 more than once. This may also allow for less laser power to be used in each firing or laser pulse.

Illustrated in FIG. 5 is an alternative embodiment of a laser shock peening process in accordance with the present invention. The process may be used to laser shock peen the entire, or a portion of, the fan blade leading edge using five rows of laser shock peened spots and covering the entire area of the laser shock peened surfaces 54 in four sequences designated S1, S2, S3 and S4. The laser shock penning process starts with the first sequence where every four spots is laser shock peened on sequence 1 while the blade is continuously moved and the laser beam is continuously fired or pulsed and the laser. The part is timed to move between adjacent laser shock peened spots in the given sequence such as S1. The timing coincides with the rep between the pulses of the continuous laser firing on the blade. All five rows of the overlapping laser shocked peened circular spots 58 contain spots of each sequence spaced apart a distance so that other laser shock peened circular spots of the same sequence don't effect the tape around it. Sequence 1, preceded by a first taping, is shown by the complete or full circles in the FIG. 4 while the other laser shock peened spots such as in sequence S2, S3 and S4 are illustrated as dotted line, single dashed line, and double dashed line circles, respectively. Before the next sequence, such as between sequence S1 and sequence S2, the entire area of the laser shock peening surface 54 to be laser shock peened is re-taped. This procedure of re-taping avoids any of the bare metal of the laser shock peening surface from being hit directly with the laser beam. For an area coverage of five rows with the spacing between rows and between adjacent spots of about 30%, it is found that one tape and three re-tapes will be necessary so that the part is actually taped four times in total which is much faster and less consuming of manpower and machinery than the painting and re-painting steps it replaces. It has been found desirable to laser shock peen a given part, such as a fan blade, with between two and five rows. It has also been found desirable to laser shock peen each spot 58 up to 3 or more times. If each spot 58 is hit 3 times then 1 taping and 11 re-tapings is required for three sets of sequences S1-S4 for a total of 12 tapings.

While the preferred embodiment of the present invention has been described fully in order to explain its principles, it is understood that various modifications or alterations may be made to the preferred embodiment without departing from the scope of the invention as set forth in the appended claims.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

1. A method of laser shock peening an article, the method comprising the following steps:
   coating a laser shock peening surface of a substrate of the article with an integrated laser shock peening coating,
   the integrated laser shock peening coating comprising a film or a tape having an ablative medium layer spaced apart from a clear containment layer and a stationary clear liquid confining medium therebetween wherein the clear transparent to a laser beam used for laser shock peening,
   firing a laser beam on the coated substrate, and
   firing the laser beam with sufficient power to vaporize at least a portion of the ablative medium layer forming a region having deep compressive residual stresses extending into the substrate from the laser shock peening surface.

2. A method as claimed in claim 1 further comprising the clear liquid confining medium including water.

3. A method as claimed in claim 1 further comprising the clear liquid confining medium including a mixture of water and agar.

4. A method as claimed in claim 1 wherein the coating is a tape further comprising:

the ablative medium layer having opposite first and second sides, an adhesive layer being disposed on the first side, and the clear liquid confining medium being entrapped against the second side by the clear containment layer.

5. A method as claimed in claim 4 further comprising the clear liquid confining medium including water.

6. A method as claimed in claim 4 further comprising the clear liquid confining medium including a mixture of water and agar.

7. A method as claimed in claim 1 further comprising firing the laser beam with repeatable pulses between relatively constant periods on the coated substrate while providing continuous movement between the laser beam and the coated substrate.

8. A method as claimed in claim 7 further comprising the clear liquid confining medium including water.

9. A method as claimed in claim 7 further comprising the clear liquid confining medium including a mixture of water and agar.

10. A method as claimed in claim 7 wherein the coating is a tape further comprising:

the ablative medium layer having opposite first and second sides, an adhesive layer being disposed on the first side, and the clear liquid confining medium being entrapped against the second side by the clear containment layer.

11. A method as claimed in claim 10 further comprising the clear liquid confining medium including water.

12. A method as claimed in claim 10 further comprising the clear liquid confining medium including a mixture of water and agar.

13. An integrated laser shock peening coating comprising a film or a tape having an ablative medium layer spaced apart from a clear containment layer and a stationary clear liquid confining medium therebetween wherein the clear transparent to a laser beam used for laser shock peening.

14. An integrated laser shock peening coating as claimed in claim 13 further comprising the clear liquid confining medium including water.

15. An integrated laser shock peening coating as claimed in claim 13 further comprising the clear liquid confining medium including a mixture of water and agar.

16. An integrated laser shock peening coating as claimed in claim 13 wherein the coating is a tape further comprising:

the ablative medium layer having opposite first and second sides, an adhesive layer being disposed on the first side, and the clear liquid confining medium being entrapped against the second side by the clear containment layer.

17. An integrated laser shock peening coating as claimed in claim 16 further comprising the clear liquid confining medium including water.

18. An integrated laser shock peening coating as claimed in claim 16 further comprising the clear liquid confining medium including a mixture of water and agar.

19. An article coated for laser shock peening, the article comprising a substrate coated with an integrated laser shock peening coating comprising a film or a tape having an ablative medium layer spaced apart from a clear containment layer and a stationary clear liquid confining medium therebetween wherein the clear transparent to a laser beam used for laser shock peening.

20. An article as claimed in claim 19 further comprising the clear liquid confining medium including water.

21. An article as claimed in claim 19 further comprising the clear liquid confining medium including a mixture of water and agar.

22. An article as claimed in claim 19 wherein the coating is a tape further comprising:

the ablative medium layer having opposite first and second sides, an adhesive layer being disposed on the first side, and the clear liquid confining medium being entrapped against the second side by the clear containment layer.

23. An article as claimed in claim 22 further comprising the clear liquid confining medium including water.

24. An article as claimed in claim 22 further comprising the clear liquid confining medium including a mixture of water and agar.

* * * * *